United States Patent
Chakra et al.

(10) Patent No.: US 9,762,521 B2
(45) Date of Patent: Sep. 12, 2017

(54) SEMANTIC ANALYSIS AND DELIVERY OF ALTERNATIVE CONTENT

(71) Applicant: INTERNATIONAL BUSINESS MACHINES CORPORATION, Armonk, NY (US)

(72) Inventors: Al Chakra, Apex, NC (US); Anuradha D. Chitta, Bangalore (IN); Liam Harpur, Dublin (IE); Soumitra G. Limaye, Pune (IN); Ranjit S. Rai, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/996,253

(22) Filed: Jan. 15, 2016

(65) Prior Publication Data
US 2017/0208025 A1 Jul. 20, 2017

(51) Int. Cl.
*H04L 12/58* (2006.01)
*H04L 29/08* (2006.01)

(52) U.S. Cl.
CPC .............. *H04L 51/18* (2013.01); *H04L 67/02* (2013.01); *H04L 67/327* (2013.01)

(58) Field of Classification Search
CPC ...................................................... H04L 51/18
USPC ............................................................ 709/206
See application file for complete search history.

(56) References Cited

U.S. PATENT DOCUMENTS

| | | | | |
|---|---|---|---|---|
| 5,471,670 A * | 11/1995 | Hess | ..................... | H04W 36/20 455/161.3 |
| 7,958,199 B2 | 6/2011 | Ferrari et al. | | |
| 8,433,800 B2 | 4/2013 | Chor | | |
| 8,543,675 B1 * | 9/2013 | Yiu | .................. | G06F 17/30899 709/223 |
| 8,700,719 B1 * | 4/2014 | Covitz | ................ | G06Q 10/107 709/204 |
| 8,812,734 B2 * | 8/2014 | Shafi | ................. | G06F 17/30893 709/206 |
| 8,959,330 B2 * | 2/2015 | Dobronsky | ....... | G06F 17/30899 709/206 |
| 8,972,412 B1 * | 3/2015 | Christian | .......... | G06F 17/30882 707/748 |
| 9,037,178 B1 * | 5/2015 | Grochla | ........................ | 370/252 |
| 9,152,694 B1 * | 10/2015 | Padidar | ............. | G06F 17/30598 |
| 2003/0144921 A1 * | 7/2003 | Okubo | ................... | G06Q 30/02 705/26.3 |

(Continued)

OTHER PUBLICATIONS

Freed et al., "Multipurpose Internet Mail Extensions (MIME) Part One: Format of Internet Message Bodies", RFC2045, 1996.*

(Continued)

*Primary Examiner* — O. C. Vostal
(74) *Attorney, Agent, or Firm* — L. Jeffrey Kelly

(57) ABSTRACT

A method, computer program product, and system for identifying attributes of a link embedded in a digital communication, generating a list of alternative links based on the identified link attributes by searching the internet for alternative links; organizing the list of alternative links based on characteristics of a recipient of the digital communication, and selecting an alternate link from the list of alternative links based on the characteristics of the recipient, wherein the selected alternate link provides comparable content to the recipient as the link.

19 Claims, 4 Drawing Sheets

(56) References Cited

U.S. PATENT DOCUMENTS

| | | | |
|---|---|---|---|
| 2004/0068527 A1* | 4/2004 | Smith, III | G06F 17/30855 |
| 2005/0235036 A1* | 10/2005 | Nielsen | G06Q 10/107 709/206 |
| 2005/0246337 A1* | 11/2005 | Forman | G06K 9/00154 |
| 2006/0251339 A1* | 11/2006 | Gokturk | G06F 17/30253 382/305 |
| 2006/0265417 A1* | 11/2006 | Amato | G06F 17/30864 |
| 2006/0265745 A1* | 11/2006 | Shackleton | G06F 21/552 726/22 |
| 2007/0033264 A1* | 2/2007 | Edge | H04L 29/12066 709/217 |
| 2007/0208714 A1* | 9/2007 | Ture | G06F 17/3064 |
| 2008/0071774 A1 | 3/2008 | Gross | |
| 2008/0082405 A1* | 4/2008 | Martinez | G06Q 30/00 705/14.17 |
| 2008/0147813 A1* | 6/2008 | Damm | G06Q 10/107 709/206 |
| 2008/0189373 A1* | 8/2008 | Ikonen | H04L 12/583 709/206 |
| 2009/0076887 A1* | 3/2009 | Spivack | G06Q 30/02 705/14.69 |
| 2009/0254836 A1* | 10/2009 | Bajrach | G11B 27/105 715/745 |
| 2011/0113317 A1* | 5/2011 | Ramaswamy | G06F 17/30876 715/205 |
| 2011/0179061 A1* | 7/2011 | Chilakamarri | G06Q 10/00 707/769 |
| 2011/0196933 A1* | 8/2011 | Jackson | G06Q 10/107 709/206 |
| 2011/0252103 A1* | 10/2011 | Beyer | G06Q 10/107 709/206 |
| 2011/0258532 A1* | 10/2011 | Ceze | G06F 17/30902 715/234 |
| 2012/0054369 A1* | 3/2012 | Shafi | G06F 17/30893 709/246 |
| 2012/0197980 A1* | 8/2012 | Terleski | G06Q 50/01 709/203 |
| 2012/0203839 A1* | 8/2012 | Kalaboukis | G06F 17/30622 709/204 |
| 2012/0239761 A1* | 9/2012 | Linner | G06F 17/2765 709/206 |
| 2012/0272160 A1* | 10/2012 | Spivack | G06Q 10/10 715/752 |
| 2012/0323938 A1* | 12/2012 | Skeen | G06F 17/30752 707/754 |
| 2013/0091206 A1* | 4/2013 | Moraes | G06Q 50/01 709/204 |
| 2013/0262596 A1* | 10/2013 | Srikrishna | G06F 17/30755 709/206 |
| 2013/0311678 A1* | 11/2013 | Schwan | G06F 17/30876 709/245 |
| 2014/0094208 A1* | 4/2014 | Egner | H04W 72/085 455/513 |
| 2014/0108572 A1* | 4/2014 | Borzilleri | H04L 51/34 709/206 |
| 2014/0244734 A1* | 8/2014 | Nutt | G06Q 10/10 709/203 |
| 2014/0263609 A1* | 9/2014 | Moar | G06F 17/30 235/375 |
| 2014/0351237 A1 | 11/2014 | Rezaei et al. | |
| 2015/0067833 A1* | 3/2015 | Verma | H04L 63/1483 726/22 |
| 2015/0088308 A1* | 3/2015 | Isobe | B25J 9/0048 700/245 |
| 2015/0248665 A1* | 9/2015 | Walz | G06Q 30/0257 705/14.27 |
| 2015/0350144 A1* | 12/2015 | Zeng | H04L 51/30 709/206 |
| 2016/0014245 A1* | 1/2016 | Zaitsev | H04M 1/0249 455/557 |

OTHER PUBLICATIONS

Moore et al., "MIME (Multipurpose Internet Mail Extensions) Part Three: Message Header Extensions for Non-ASCII Test", RFC2047, 1996.*

* cited by examiner

SEMANTIC ANALYSIS AND DELIVERY OF ALTERNATIVE CONTENT

BACKGROUND

The present invention relates generally to the field of data processing and more particularly to information retrieval from the internet.

Information is shared over the internet using a variety of digital communication mediums, such as, for example, email, forums, wikis, and the like. Users often include links, or hyperlinks, to web content using the above digital communication mediums. These links may be accessed from different networks, in different geographical locations, based on where the recipient is located. For example, user A (located in US) sends an email to user B (located in India). The email may contain a link directed at particular content. In the above example, the speed with which the link opens and the content is accessed may be different for user A than for user B.

SUMMARY

Embodiments of the present invention disclose a method, computer program product, and system for identifying attributes of a link embedded in a digital communication, generating a list of alternative links based on the identified link attributes by searching the internet for alternative links, organizing the list of alternative links based on characteristics of a recipient of the digital communication, and selecting an alternate link from the list of alternative links based on the characteristics of the recipient, wherein the selected alternate link provides comparable content to the recipient as the link.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
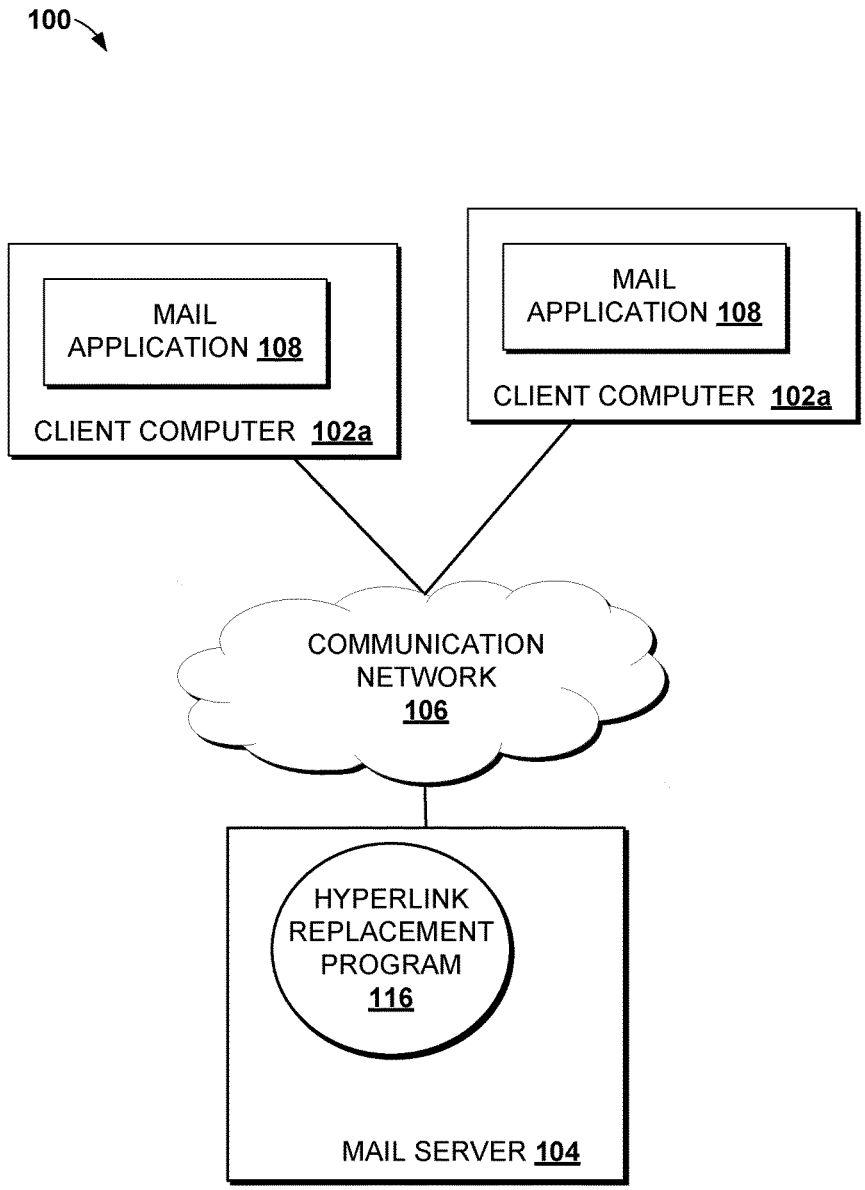
FIG. 1 is a functional block diagram illustrating a system for automatically processing a link embedded in a digital communication and providing the recipient of the digital communication with the alternate link in a networked computer system, in accordance with an exemplary embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

In this disclosure we are describing a program to automatically process links (e.g. hyperlinks, URLs) to derive alternate content which can be delivered at high speed for a recipient. The program will, in real time, extract the intent of a message containing a link and will try to find an alternate link which works better for the recipient. For example, at the point of a sender creating the link in the email message in which the recipient field is populated, the program will process the content of the link and provide the best alternate link before sending the email. An alternate link which works better for the recipient will render faster and more efficiently than the original link. Moreover, in some examples, the content of the alternative link is better or more suited to the recipient than the content of the original link, based on recipient characteristics like culture, language, or perspective to name a few.

For example, at the point of a sender creating the link in the email message in which the recipient field is populated, the program 116 will process the content of the link and provide the best alternate link before sending the email. In such cases, the program 116 runs on or in conjunction with the sender's computer.

The present invention relates generally to a method, system, and computer program product for data processing, and more particularly, to a method, system, and computer program product for automatically processing a link embedded in a digital communication and providing a recipient of the digital communication with an alternate link [containing better content faster]. One way to automatically process the link and provide the recipient with the alternate link is to select the alternate link based on attributes of the link and characteristics of the recipient. One embodiment by which to automatically process the link and provide the recipient with the alternate link is described in detail below by referring to the accompanying drawings in FIGS. 1 to 4. Those skilled in the art will readily appreciate that the detailed description given herein with respect to these figures is for explanatory purposes as the invention extends beyond these limited embodiments.

Referring now to FIG. 1, a functional block diagram illustrating a link replacement system 100 (hereinafter "system") for automatically processing the link embedded in a digital communication and providing the recipient of the digital communication with the alternate link, in accordance with an embodiment of the present invention is shown. The system 100 may include client computers 102a, 102b and a mail server 104. The client computer 102 may communicate with the mail server 104 via a communications network 106 (hereinafter "network"). The client computers 102a, 102b may include a mail application 108, and are enabled to interface with a user and communicate with the mail server 104. The mail server 104, which may be used for receiving, sorting, and distributing messages from one computer to another, is enabled to run a link replacement program 116 (hereinafter "program"). In an embodiment, the client computers 102a, 102b may each operate as an input device including a user interface while the program 116 may run primarily on the mail server 104. In an alternative embodiment, the program 116 may run primarily on one or both client computers 102a, 102b while the mail server 104 may be used for processing and storage of data used by the program 116. It should be noted that the program 116 may be a standalone program or may be integrated into a larger mail management program.

In the present system 100, for example, an email message is sent by a sender from client computer 102a, processed by the mail server 104, and received by the addressee or recipient at client computer 102b. It should be noted that the email of the present example may include any form of digital communication including but not limited to email messages, instant messages forums, social media sites, wikis. In such cases, the mail server 104 may be replaced by any server handling the digital communication. In the present embodiment, the sender may include links directed at specific content intended for the recipient.

It should be noted, however, that processing for the program 116 may, in some instances be shared amongst the client computers 102a, 102b and the mail server 104 in any ratio. In another embodiment, the program 116 may operate on more than one mail server, client computer, or some combination of mail servers and client computers, for example, a plurality of client computers 102 communicating across the network 106 with a single mail server 104, as illustrated. In another embodiment, for example, the program 116 mail operate on a plurality of mail servers communicating across the network 106 with a plurality of client computers. Alternatively, the program may operate on a network server communicating across the network with a mail server and a plurality of client computers.

The network 106 may include wired connections, wireless connections, fiber optic connections, or some combination thereof. In general, the network 106 can be any combination of connections and protocols that will support communications between the client computer 102 and the server computer 104. The network 106 may include various types of networks, such as, for example, a local area network (LAN), a wide area network (WAN) such as the Internet, a telecommunication network, a wireless network, a public switched network and/or a satellite network.

In various embodiments, the client computers 102a, 102b and/or the mail server 104 may be, for example, a laptop computer, tablet computer, netbook computer, personal computer (PC), a desktop computer, a personal digital assistant (PDA), a smart phone, a mobile device, or any programmable electronic device capable of communicating with the mail server 104 via the network 106. As described below with reference to FIG. 4, the client computers 102a, 102b and the mail server 104 may each include internal and external components.

In an embodiment, the system 100 may include any number of client computers 102 and/or server computers 104; however, only one of each is shown for illustrative purposes only. It may be appreciated that FIG. 1 provides only an illustration of one implementation and does not imply any limitations with regard to the environments in which different embodiments may be implemented. Many modifications to the depicted environments may be made based on design and implementation requirements.

The link replacement system 100 illustrates one example of the basic functional blocks of a link replacement system. Other models for a link replacement system are available that describe link replacement systems in greater or lesser granularity and with different functional boundaries between functional blocks.

The link replacement program 116 and associated methods are described and explained in further detail below with reference to FIGS. 2-4.

Figure 2:
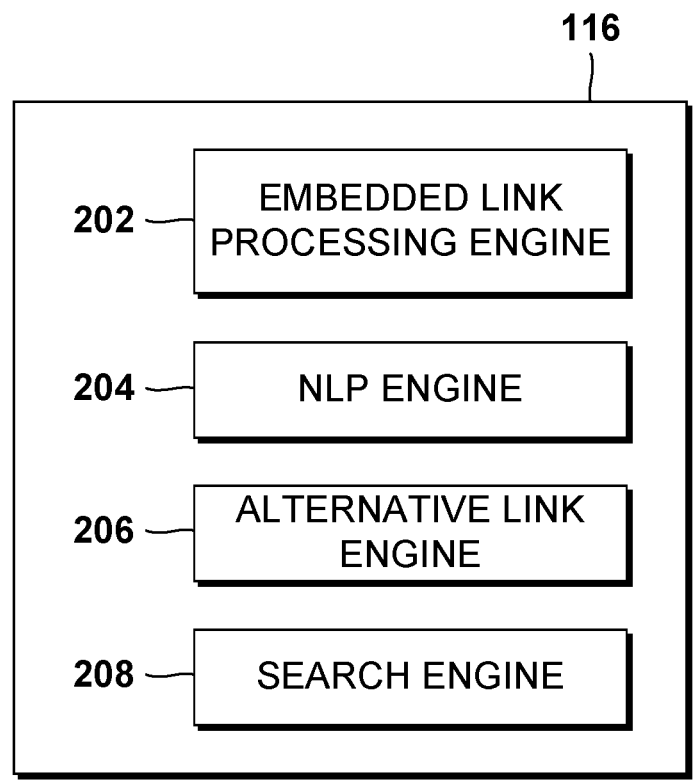
FIG. 2 is a functional block diagram of a link replacement program, in accordance with an exemplary embodiment.

Referring now to FIG. 2, a functional block diagram of the link replacement program 116 of FIG. 1, is shown in accordance with an exemplary embodiment of the present invention. The program 116 may include an embedded link processing engine 202 (hereinafter "processing engine"), a natural language processing (NLP) engine 204, an alternate link engine 206, and a search engine 208. When the mail server 104 receives an incoming message from a sender's computer, for example the client computer 102a, it is processed by the processing engine 202. The processing engine 202 first scans the email for links. The processing engine 202 creates or generates a log of link attributes for each link retrieved from the email during scanning. The link attributes may include, but are not limited to, keywords, tags, content, version information, site value, language, rendering speed, or some combination thereof. In an embodiment, for example, the processing engine 202 will extract specific attributes, such as, for example, keywords, that can be used by a search engine to search for an alternate link which is more suitable to the addressee or the recipient of the email, as described in detail below.

The NLP engine 204 determines the relevant content of the link based on the context or intent of the email. Specifically, the NLP engine 204 determines what content of the link is relevant to the recipient as intended by the sender. As such, the relevant content determined by the NLP engine 204 can be defined as content of the original link which is relevant to the recipient as intended by the sender. Alternately, the determined relevant content may include link content which is directed to the subject matter of the email. In the exemplary embodiment, the NLP engine 204 uses known natural language processing techniques to determine the relevant content of the link; however, other known techniques may be used. In some instances, for example, the original link embedded in the email may direct the recipient to a source where only a small portion of its content is related to the subject matter of the email and thus relevant to the recipient.

For example, in an embodiment, the email is about strategic management and may contain a link to a video of a business meeting. In the message, the sender instructs the recipient to watch only a portion of the business video relating to strategic management. In such cases, the NLP engine 204 would determine the relevant content based on the context or intent of the email, which is to deliver video content directed at the specific topic of strategic management.

The alternate link engine 206 then receives the link attributes identified by the processing engine 202 and the determined relevant content derived by the NLP engine 204, and generates a list of links based on the link attributes and the determined relevant content. Specifically, the alternate link engine 206 then generates a search query based on the link attributes and the determined relevant content.

The search query is sent, by the alternate link engine 206, the search engine 208. The search engine 208 searches the internet for an alternate link based on the search query. Search results, including a list of one or more alternate links, are them provided back the alternate link engine 206.

Preferably, the alternate links provide the same or similar content as the original link embedded in the incoming email. The alternate links provide the same or similar content when, for example, there is a match or similarity, in link attributes, relevant content, or some combination thereof. Optimally, the alternate links provided by the search engine 208 should each be a suitable substitute to the original link embedded in the email.

In some instances, the alternate links may provide content identical to that of the original embedded link however from an alternate source, for example, a different hosting server. In other instances, the alternate links may provide similar content with the same context and intent to that of the original message.

In an embodiment, the alternate link engine 206 may organize or further narrow the search results provided by the search engine 208 based on characteristics of the recipient of the message. The recipient characteristics may include, for example, URL rendering speed, content relevancy, geographical location, culture, language, perspective, or some combination thereof. In a preferred embodiment, the list of alternate links is organized by the alternate link engine 206 based on rendering speed or load time. For example, each of the alternate links provided by the search engine 208 may be assigned a value based on rendering speed alone. The list of alternate links may then be organized in numeric order using the assigned values. In some cases, if actual rendering speeds or load times cannot be ascertained for either the original link and/or its alternatives or substitutes at the time of sending, then approximates values are ascertained by proxy recipients in the same geographic location. In yet another embodiment, a value or score may be assigned to each alternate link for each attribute in addition to its rendering speed. For example, a single alternate link may be assigned a value or score for its rending speed, keywords, and language. In general, a higher score may indicate a closer match or similarity between the particular alternate link and the original link.

Alternatively, the recipient characteristics can be added to the search query provided to the search engine 208 in addition to the above search criteria. The search results would then include alternate links based on both the above search criteria and the recipient characteristics.

The alternate link engine 206 selects one alternate link from the search results provided by the search engine 208 based on the recipient characteristics. In general, the alternate link selected by the alternate link engine 206 may preferably be the best match to the original link based on the link attributes, relevant content, and recipient characteristics. The alternative link engine 206 then compares the content of the selected alternate link to the content of the original link and confirms it applicability. For example, the alternate link engine 206 confirms the semantics of the original link match those of the selected alternate link. In a preferred embodiment, the alternate link will have a faster rendering speed or load time over the original link embedded in the email. In an embodiment, the alternate link engine 206 will verify rendering speed using a client side component at the sender and recipient machines.

The program 116 will replace the original link embedded in the email with the selected alternate link before the message is sent by the mail server 104 to the recipient's computer, for example, client computer 102b. More specifically, the program 116 will map the selected alternate link to the URL of the original link so that when the recipient of the email clicks on the link they will be redirected to the new content provided by the alternate link. The recipient is alerted they were re-directed to a better link with details regarding whether the alternate link provides the same content faster or it provides more suitable content. In an embodiment, the recipient would have the option to continue navigating to the alternate link or navigate to the original link. In another embodiment, the program 116 will automatically fail-back if it determines the alternate link is slower, and thus not better, than the original link.

In some embodiments, when a recipient receives the email the program 116 would re-evaluate the selected alternate link by processing the alternative link to determine if it is the best link or if there is a better link. In some instances, the program would only re-evaluate the alternate link if, for example, the recipient opens the message after a threshold amount of time, such as, 5 days later.

A primary goal of the embodiments disclosed above is to process content in links, ascertain the rendering speed of the links at a source and a destination with the aim or purpose of providing better content faster. The above embodiments provide a quicker alternative to static content provided by a static link contained within an email or the like.

Embodiments of the present invention are described with respect to the components and their functionality as presented in FIG. 1. Other embodiments of the present invention may perform the invention as claimed with different functional boundaries between components. For example, the functionality of the link replacement program 116 may be implemented as a standalone component, or may be incorporated as a function of the link replacement system 100.

Figure 3:
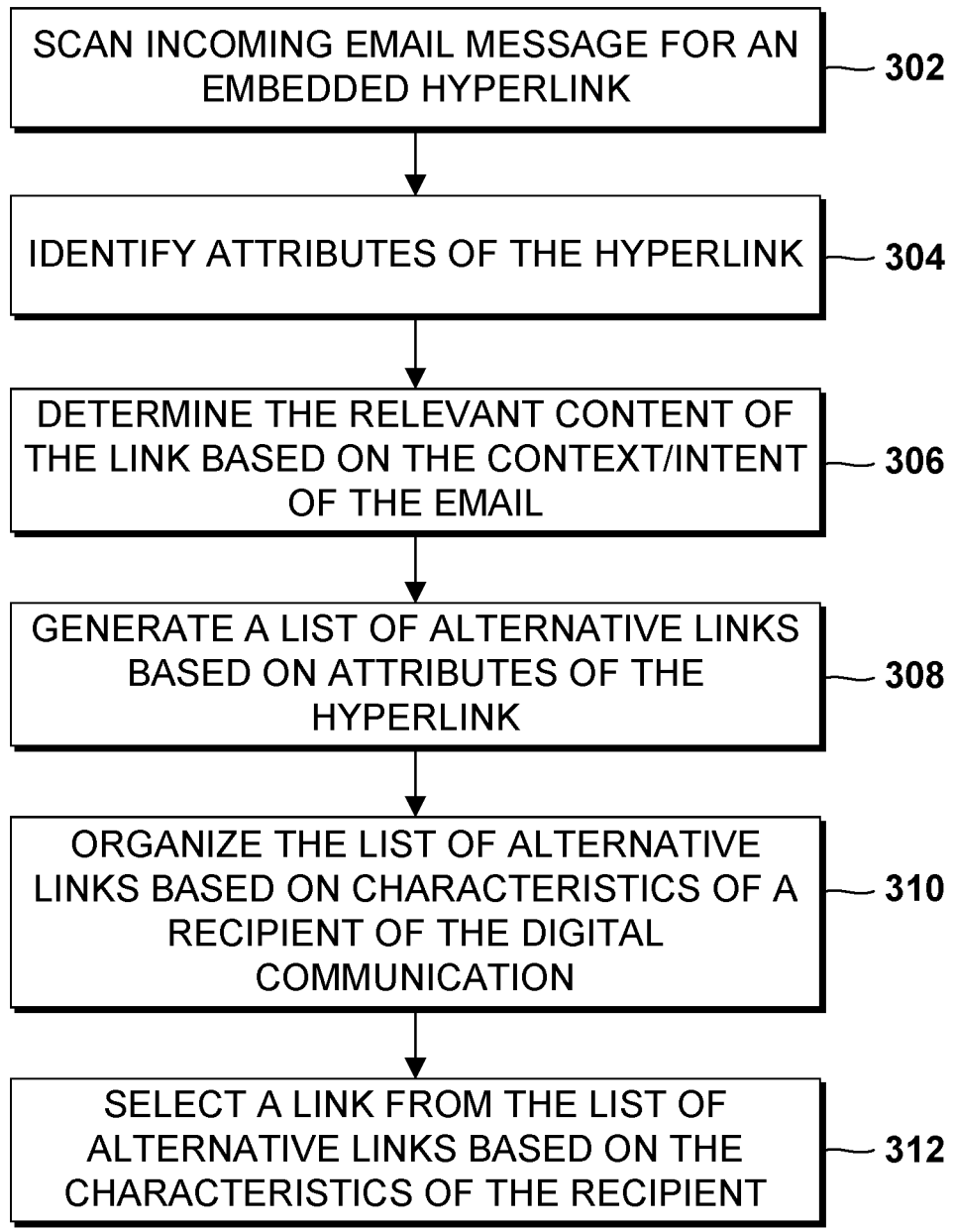
FIG. 3 is a flowchart depicting operational steps of the link replacement program within the networked computer system of FIG. 1, in accordance with an exemplary embodiment.

Referring now to FIG. 3, a flowchart depicting the operational steps of the link replacement program 116 of FIG. 1, is shown in accordance with an embodiment of the present invention. In general, the program 116 may be performed in multiple steps, including but not limited to those illustrated in the flowchart of FIG. 3. First, the processing engine 202 scans the email and retrieves a link (at 302). In an alternative embodiment, the embedded link processing engine 302 does not scan the email and receives the link from, for example, another program or system component. Next, the processing engine 202 processes the link and identifies the attributes of the link (at 304). The email message is further processed by the NLP engine 204 to determine the relevant content of the link based on the context or intent of the email (at 306). The alternate link engine 206 receives the link attributes from the processing engine 202 and the determined relevant content from the NLP engine 204, and generates a list of alternate links based on the link attributes and the determined relevant content (at 308).

The alternate link engine 206 generates a search query based on both the link attributes and the determined relevant content received from the processing engine 202 and the NLP engine 204, respectively. The alternative link engine 206 sends the search query to the search engine 208 which returns search results. The search results include one or more alternate links which may be organized or ranked based on known ranking methods. The alternate link engine 206 may further organize or narrow the list of alternative links returned by the search engine 208 based on characteristics of the recipient (at 310). Lastly, the alternative link engine 206 select one alternative link from the list of alternative links and confirms its applicability (at 312).

It should be noted that, the processing engine 202 and the NLP engine 204 may operate concurrently or in succession in identifying link attributes and determining relevant content, respectively. In some embodiments, the alternate link engine 206 may proceed with generating the list of alternate links based solely on the list of attributes without using the NLP engine 204 to determine the context of the email. As such, in an embodiment, the alternate link engine 206 receives only the link attributes from the processing engine 202, and generates a list of alternate links based only on the link attributes (at 308).

It should be noted that some or all of the operational steps detailed above may be repeated for every link retrieved by the processing engine 202 during scanning of the email.

Figure 4:
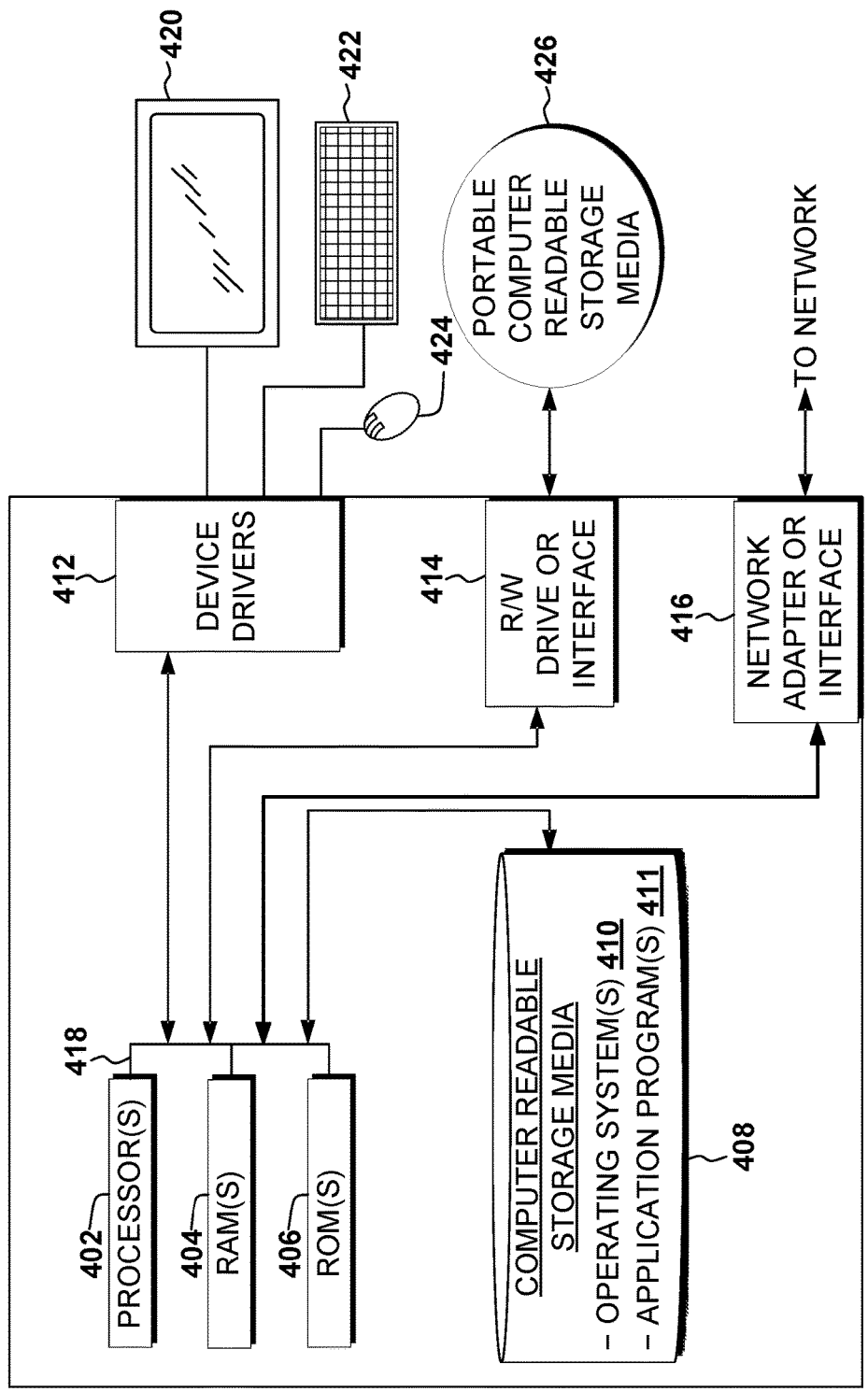
FIG. 4 is a block diagram of an exemplary computing device, in accordance with an exemplary embodiment.

Referring now to FIG. 4, a block diagram of components of a computing device, such as the client computer 102 or the server computer 104, of the system 100 of FIG. 1, in accordance with an embodiment of the present invention is shown. It should be appreciated that FIG. 4 provides only an illustration of one implementation and does not imply any limitations with regard to the environments in which different embodiments may be implemented. Many modifications to the depicted environments may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the link replacement program 116, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include a network adapter or interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method comprising:
   identifying keywords of a link embedded by a sender in an email message;
   determining relevant content of the link based on the subject matter of the email message using natural language processing, wherein the relevant content of the link is a portion less than the total content of the link;
   generating a search query based on the identified keywords and the determined relevant content;
   searching the internet for a list of alternative links based on the search query;
   organizing the list of alternative links based on characteristics of a recipient of the email message; and
   selecting an alternate link from the list of alternative links based on the characteristics of the recipient, wherein the selected alternate link delivers the determined relevant the content.

2. The method according to claim 1, further comprising:
   replacing the link embedded in the email message with the selected alternate link before sending the email to the recipient; and
   in response to the recipient interacting with the alternate link, notifying the recipient they were re-directed to the alternate link with details regarding why they were re-directed to the alternate link.

3. The method according to claim 1, further comprising:
   receiving the email message from a sender physically located in a first geographical location; and sending the email message to the recipient physically located in a second geographical location, wherein the link is replaced with the selected alternate link before the email is sent.

4. The method according to claim 1, wherein the selected alternate link comprises a rendering speed less than a rending speed of the link.

5. The method according to claim 1, wherein the characteristics of the recipient comprise URL rendering speed, content relevancy, geographical location, culture, language, perspective, or some combination thereof.

6. The method according to claim 1, further comprising:
identifying tags, content, version info, site value, and language; and
generating the search query based on the identified tags, content, version info, site value, and language, and the determined relevant content.

7. The method according to claim 1, further comprising:
comparing content of the selected alternate link to the content of the link after a predetermined period of time has passed; and
selecting a different alternate link from the list of alternative links based on the characteristics of the recipient, wherein the selected alternate link provides comparable content to the recipient as the link.

8. A computer implemented method comprising:
identifying attributes of a URL embedded in a posted message on an internet forum;
determining, by the mail server, content of the URL relevant to a recipient of the posted message using natural language processing based on the context of the posted message;
generating, by the mail server, a search query based on the identified URL attributes, the determined relevant content, and;
searching the internet based on the search query to generate a list of alternative URLs;
organizing the list of alternative URLs based on characteristics of a viewer of the posted message;
selecting one alternate URL from the list of alternative URLs based on the characteristics of the viewer, wherein each of the alternative URLs comprises at least one matching attribute with the embedded link; and
replacing the URL embedded in the posted message with the selected alternate URL before posting the message on the internet forum.

9. The method according to claim 8, further comprising:
in response to the viewer interacting with the selected alternate link, alerting the viewer they were re-directed to the selected alternate link with details regarding why they were re-directed to the selected alternate link.

10. The method according to claim 8, further comprising:
selecting a different alternate URL from the list of alternative URLs based on rendering speed, wherein the rendering speed of the different alternate URL is faster than the rendering speed of the selected alternate URL.

11. The method according to claim 8, wherein the selected alternate URL comprises a rendering speed less than a rending speed of the URL.

12. The method according to claim 8, wherein the characteristics of the recipient comprise URL rendering speed, content relevancy, geographical location, culture, language, and perspective.

13. The method according to claim 8, wherein the identified URL attributes comprise keywords, tags, content, version info, site value, and language, or some combination thereof.

14. A computer implemented method comprising:
receiving, by a mail server, an email message from a sender physically located in a first geographical location;
identifying, by the mail server, attributes of a link embedded in the email message wherein the identified attributes include keywords, tags, content, version info, site value, and language;
determining, by the mail server, intended content of the link based on the subject matter of the email message using natural language processing;
generating, by the mail server, a list of alternative links based on the identified attributes and the determined intended content, wherein each of the alternative links comprises at least one matching attribute with the embedded link, and each of the alternative links provides the intended content as determined from the email message;
assigning, by the mail server, a score for each attribute of each of the alternative links based on the similarity between each attribute of each alternative link and attributes of the embedded link, wherein a higher score indicates a closer match between a particular alternative link and the embedded link;
organizing, by the mail server, the list of alternative links in numeric order based on the assigned scores;
selecting, by the mail server, an alternate link from the list of alternative links based on the characteristics of a recipient, wherein the selected alternate link provides comparable content to the recipient as the link; and
sending, by the mail server, the email message to the recipient physically located in a second geographical location.

15. The method according to claim 14, further comprising:
replacing, by the mail server, the embedded link with the selected alternate link before sending the email message to the recipient.

16. The method according to claim 14, wherein the sender and the recipient are operating on different networks.

17. The method according to claim 14, wherein the selected alternate link comprises a rendering speed less than a rending speed of the link.

18. The method according to claim 14, wherein the characteristics of the recipient comprise URL rendering speed, content relevancy, geographical location, culture, language, and perspective.

19. The method according to claim 14, further comprising:
in response to the viewer interacting with the selected alternate link, alerting the viewer they were re-directed to the selected alternate link with details regarding why they were re-directed to the selected alternate link.

* * * * *